(12) United States Patent
Oohashi

(10) Patent No.: US 7,652,400 B2
(45) Date of Patent: Jan. 26, 2010

(54) AUTOMOTIVE ALTERNATOR

(75) Inventor: Atsushi Oohashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 256 days.

(21) Appl. No.: 11/950,833

(22) Filed: Dec. 5, 2007

(65) Prior Publication Data

US 2008/0290744 A1 Nov. 27, 2008

(30) Foreign Application Priority Data

May 22, 2007 (JP) ............................. 2007-134894

(51) Int. Cl.
*H02K 5/00* (2006.01)
(52) U.S. Cl. ...................... 310/68 D; 310/91
(58) Field of Classification Search ................ 3/43, 3/68 D, 68 R, 68 C, 91; 361/694–697, 702; 322/17
See application file for complete search history.

(56) References Cited

U.S. PATENT DOCUMENTS

| | | | | |
|---|---|---|---|---|
| 5,686,780 A | * | 11/1997 | Adachi et al. | 310/68 D |
| 6,081,054 A | * | 6/2000 | Kashihara et al. | 310/68 D |
| 6,291,913 B1 | * | 9/2001 | Nikawa et al. | 310/68 R |
| 6,740,995 B2 | * | 5/2004 | Oohashi et al. | 310/68 D |
| 7,535,137 B2 | * | 5/2009 | Ikuta et al. | 310/68 D |
| 7,570,488 B2 | * | 8/2009 | Oohashi et al. | 361/694 |
| 7,579,740 B2 | * | 8/2009 | Oohashi | 310/239 |
| 2002/0050750 A1 | * | 5/2002 | Oohashi et al. | 310/68 D |

FOREIGN PATENT DOCUMENTS

| | | |
|---|---|---|
| JP | 07-122861 A | 5/1995 |
| JP | 2005-151281 A | 5/1995 |
| JP | 11-044305 A | 2/1999 |
| JP | 2002-142423 A | 5/2002 |

* cited by examiner

*Primary Examiner*—Tran N Nguyen
(74) *Attorney, Agent, or Firm*—Sughrue Mion, PLLC

(57) ABSTRACT

A regulator assembly mounting threaded aperture is formed on an inner wall surface of a rear bracket, and a receiving recess portion is recessed into an inner wall surface of the rear bracket around the regulator assembly mounting threaded aperture. A regulator assembly mounting penetrating aperture is disposed through a base of a regulator assembly, and an engaging protruding portion is disposed so as to project from the base around the regulator assembly mounting penetrating aperture. The regulator assembly is fixed to the rear bracket by engaging the engaging protruding portion in the receiving recess portion and fastening a regulator assembly mounting screw that has been passed through the regulator assembly mounting penetrating aperture into the regulator assembly mounting threaded aperture.

5 Claims, 9 Drawing Sheets

AUTOMOTIVE ALTERNATOR

BACKGROUND OF THE INVENTION

1. Field of the Invention

The present invention relates to an automotive alternator and particularly relates to a mounting construction for a regulator assembly in which a brush holder portion in which a current-supplying brush is held and a regulator circuit housing portion in which a regulator circuit is housed are configured integrally.

2. Description of the Related Art

In conventional automotive alternators, regulator assemblies in which a brush holder portion in which current-supplying brushes are held and a regulator circuit housing portion in which a regulator circuit is housed are configured integrally have been disposed between two end portions of an approximate C shape of a rectifier and have been fixed inside a rear bracket by threaded fastenings (see Patent Literature 1, for example).

Patent Literature 1: Japanese Patent Laid-Open No. 2002-142423 (Gazette)

In conventional automotive alternators, when fastening the regulator assembly inside the rear bracket, it has been necessary to position penetrating apertures that are formed on the regulator assemblies to allow passage of mounting screws on threaded apertures that are formed on inner wall surfaces of the rear bracket. However, operations for positioning these penetrating apertures on the threaded apertures have been complicated, making assembly difficult.

In addition, electrode terminal portions of the regulator assembly and electrode terminal portions of the rectifier are electrically connected by fastening screws, but positioning between the electrode terminal portions of the regulator assembly and the electrode terminal portions of the rectifier has been difficult if the regulator assembly has not been mounted onto the rear bracket in a positioned state, also making operations for fastening the two electrode terminal portions complicated.

SUMMARY OF THE INVENTION

The present invention aims to solve the above problems and an object of the present invention is to provide an automotive alternator that enables assembly to be improved by enabling a regulator assembly to be disposed on a rear bracket in a positioned state.

In order to achieve the above object, an automotive alternator according to of the present invention includes: a rotor that is fixed to a rotating shaft; a front bracket and a rear bracket that rotatably support the rotating shaft and that envelop the rotor; a stator that is held by the front bracket and the rear bracket and that surrounds the rotor; and a rectifier that has: an approximately C-shaped rectifier heatsink to which a plurality of diodes are mounted; and an approximately C-shaped resin circuit board in which the plurality of diodes are connected by insert conductors so as to constitute a rectifier circuit, the rectifier being mounted to the rear bracket so as to be disposed around the rotating shaft in an approximate C shape and rectifying alternating-current output that is generated by the stator into direct current. The automotive alternator further includes; a regulator circuit that adjusts magnitude of alternating-current voltage that is generated by the stator; and a regulator assembly that has: a brush holder portion that is disposed so as to face the rotor such that an aperture direction of a brush insertion aperture is aligned in a radial direction and that holds a brush inside the brush insertion aperture; and a base into which a regulator circuit housing portion that is disposed such that a resin injection aperture faces radially outward and that houses and holds the regulator circuit is molded integrally into the brush holder portion near the rear bracket, the regulator assembly being mounted to the rear bracket such that the base is disposed between two end portions of the approximate C shape of the rectifier. A regulator assembly mounting threaded aperture is formed on an inner wall surface of the rear bracket, a receiving recess portion is recessed into an inner wall surface of the rear bracket around the regulator assembly mounting threaded aperture, a regulator assembly mounting penetrating aperture is disposed through the base, and an engaging protruding portion is disposed so as to project from the base around the regulator assembly mounting penetrating aperture. The regulator assembly is fixed to the rear bracket by engaging the engaging protruding portion in the receiving recess portion and fastening a regulator assembly mounting screw that has been passed through the regulator assembly mounting penetrating aperture into the regulator assembly mounting threaded aperture.

According to the present invention, the regulator assembly can be disposed on the rear bracket in a positioned state by engaging the engaging protruding portion in the receiving recess portion. Thus, the regulator assembly mounting penetrating aperture is positioned on the regulator assembly mounting threaded aperture and the regulator assembly mounting screw that has been passed through the regulator assembly mounting penetrating aperture can be fastened to the regulator assembly mounting threaded aperture easily, improving assembly.

Because the regulator assembly is mounted to the rear bracket in a positioned state, positioning between electrode terminal portions of the regulator assembly and electrode terminal portions of the rectifier is simplified, also facilitating the operation of fastening the two electrode terminal portions.

DETAILED DESCRIPTION OF THE PREFERRED EMBODIMENT

Figure 1:
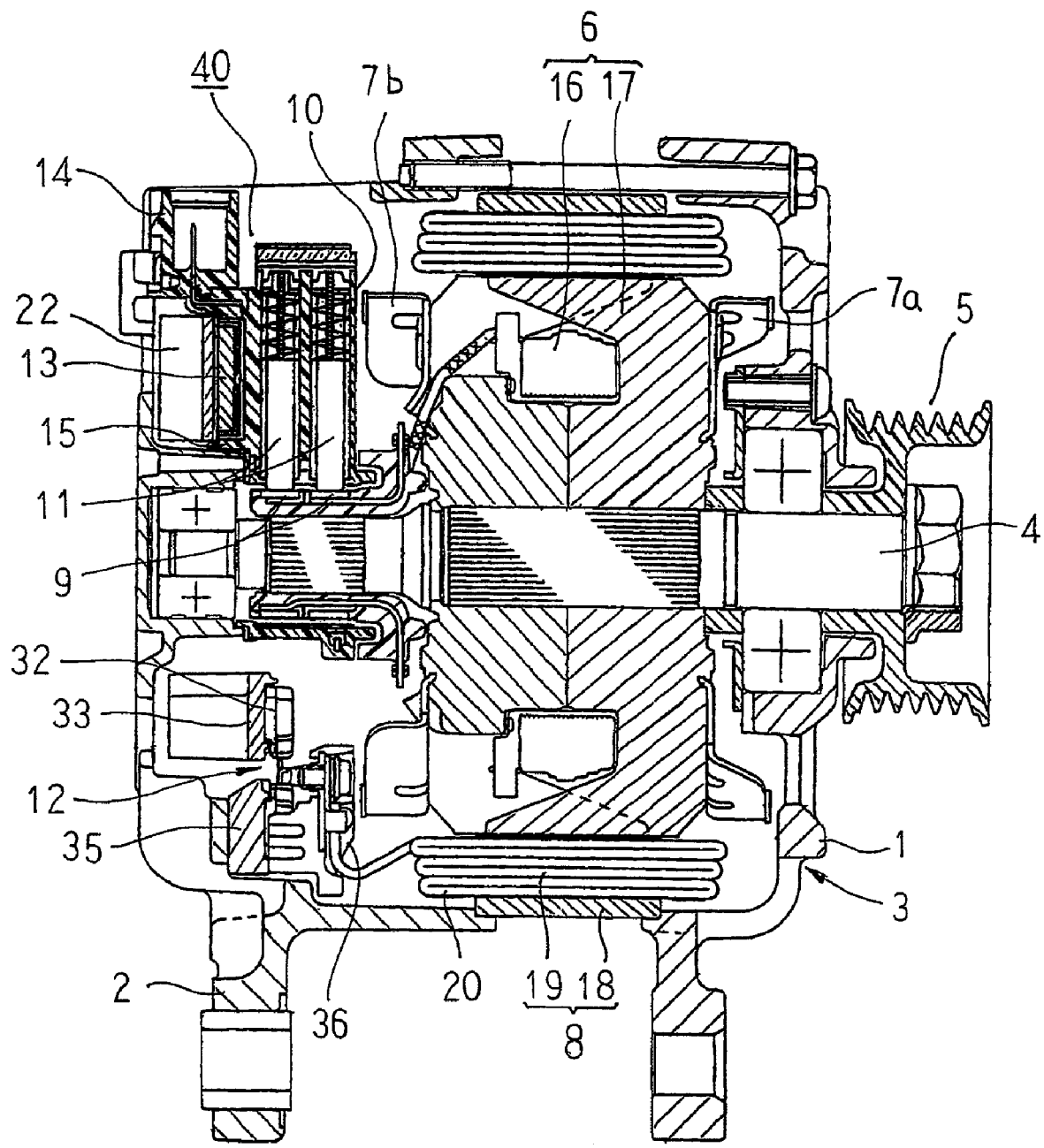
FIG. 1 is a cross section of an overall configuration of an automotive alternator according to a preferred embodiment of the present invention.

FIG. 1 is a cross section of an overall configuration of an automotive alternator according to a preferred embodiment of the present invention.

In FIG. 1, an automotive alternator includes: a case 3 that is constituted by a front bracket 1 and a rear bracket 2 that are each approximately bowl-shaped and made of aluminum; a rotating shaft 4 that is rotatably supported at a central axial position of the case 3; a pulley 5 that is fixed to a first end of the rotating shaft 4 that projects outward at a front end of the case 3; a claw-pole rotor 6 that is fixed to the rotating shaft 4 so as to be rotatably disposed inside the case 3; a stator 8 that is held by an inner wall surface of the case 3 so as to surround the rotor 6; a pair of slip rings 9 that are fixed to a second end portion of the rotating shaft 4 so as to supply electric current to a rotor coil 16 of the rotor 6; a brush holder portion 10 that is disposed radially outside the slip rings 9; brushes 11 that are disposed inside the brush holder portion 10 so as to slide in contact with the respective slip rings 9; a rectifier 12 that is electrically connected to a stator coil 19 of the stator 8 so as to rectify alternating current that is generated in the stator coil 19 into direct current; a regulator circuit 13 that adjusts magnitude of alternating voltage that is generated in the stator coil 19; and a connector portion 14 to which an external connector can be mounted.

The rotor 6 has: a rotor coil 16 that generates magnetic flux on passage of electric current; and a pole core 17 that is disposed so as to cover the rotor coil 16 and in which magnetic poles are formed by the magnetic flux. The rotating shaft 4 is inserted through a central axial position of the pole core 17 and fixed. Front and rear cooling fans 7a and 7b are fixed to two axial end surfaces of the pole core 17.

The stator 8 includes: a stator core 18 that is held between the front bracket 1 and the rear bracket 2 and that is disposed so as to surround the rotor 6; and a stator coil 19 that is mounted to the stator core 18. The stator coil 19 is prepared by installing conductor wires in slots of the stator core 18. The conductor wires extend outward from the slots of the stator core 18 at two axial ends of the stator core 18 to constitute coil ends 20. Portions of the conductor wires that are housed inside the slots of the stator core 18 are formed so as to have rectangular cross sections. Here, a rotating magnetic field is applied to the stator coil 19 by rotation of the rotor 6, generating electromotive force in the stator coil 19.

Figure 2:
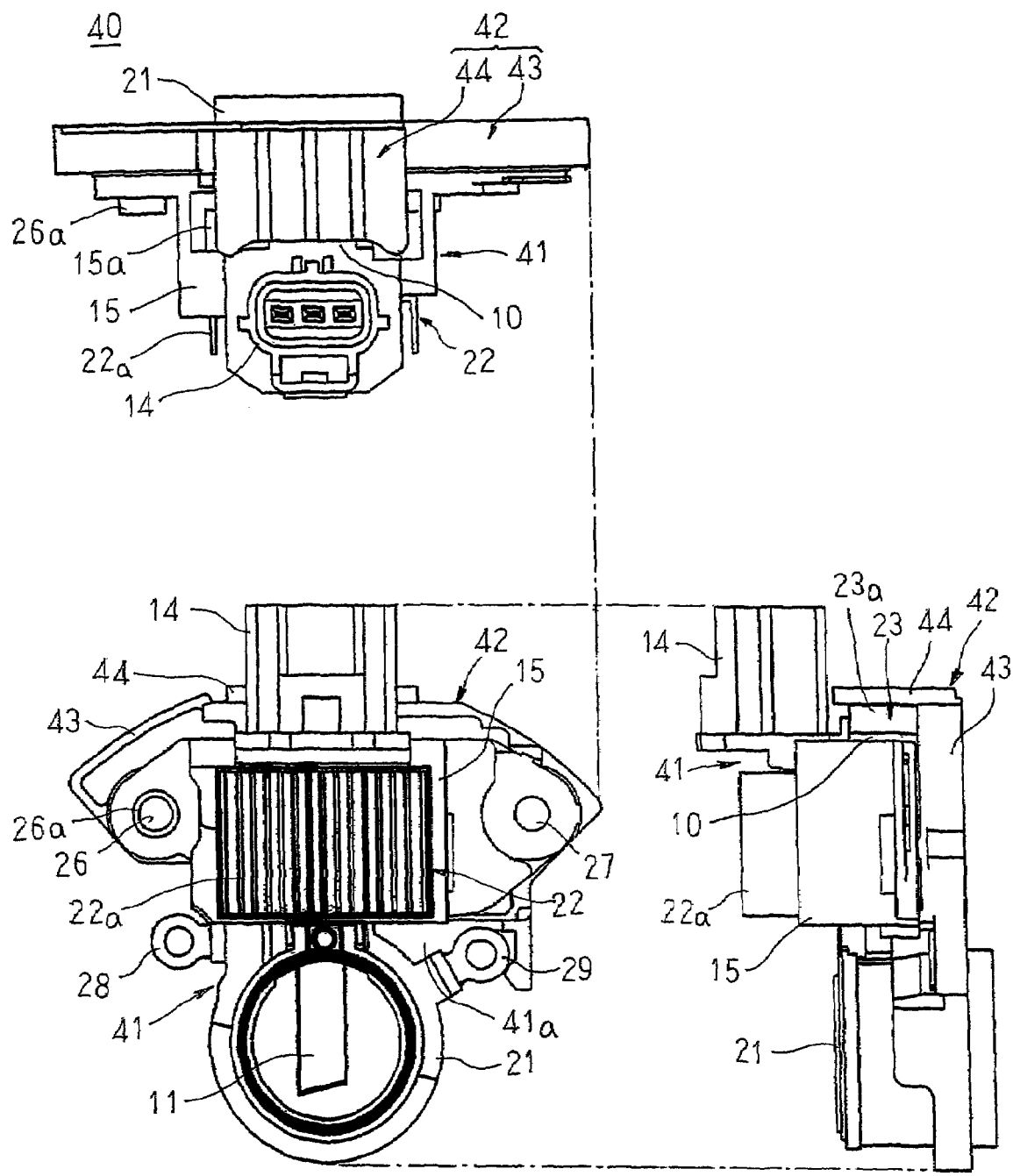
FIG. 2 is a front elevation, a top plan and a right side elevation of a regulator assembly that can be used in the automotive alternator according to the preferred embodiment of the present invention.
Figure 3:
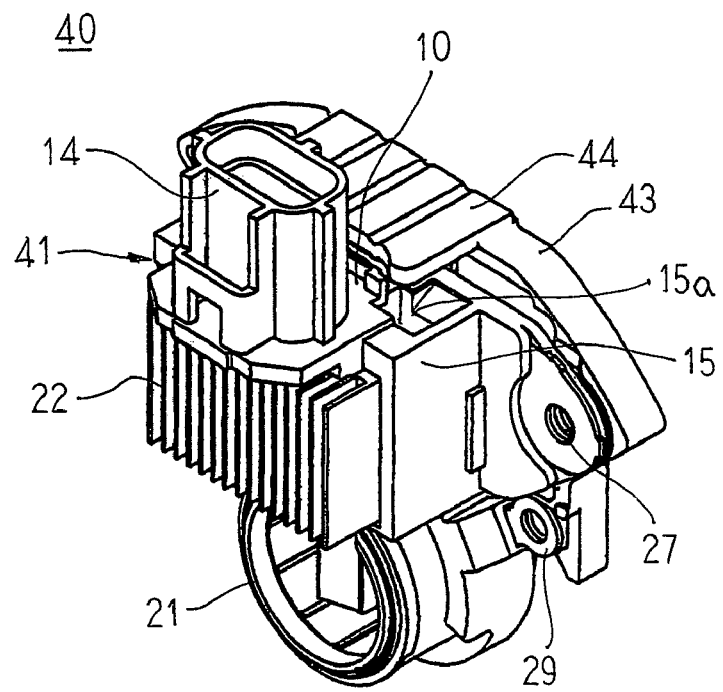
FIG. 3 is a perspective of the regulator assembly that can be used in the automotive alternator according to the preferred embodiment of the present invention.
Figure 4:
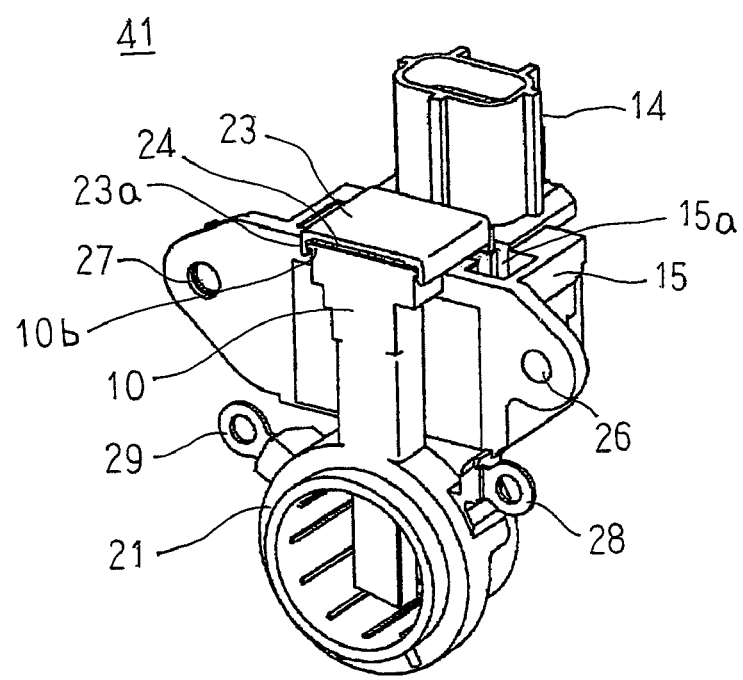
FIG. 4 is a perspective of a base that constitutes the regulator assembly that can be used in the automotive alternator according to the preferred embodiment of the present invention.
Figure 5:
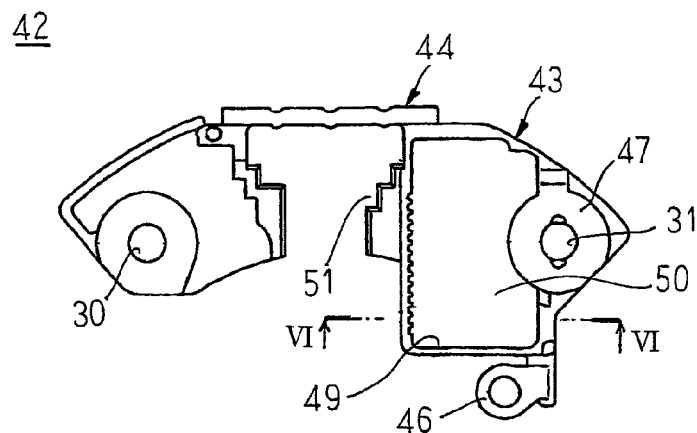
FIG. 5 is a rear elevation of a plate that constitutes the regulator assembly that can be used in the automotive alternator according to the preferred embodiment of the present invention.
Figure 6:
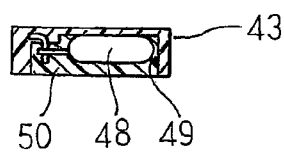
FIG. 6 is a cross section that is taken along line VI-VI in FIG. 5 so as to be viewed in the direction of the arrows.

Next, configuration of a regulator assembly 40 will be explained with reference to FIGS. 2 through 6. FIG. 2 is a front elevation, a top plan and a right side elevation of a regulator assembly that can be used in the automotive alternator according to the preferred embodiment of the present invention, FIG. 3 is a perspective of the regulator assembly, and FIG. 4 is a perspective of a base that constitutes a brush holder assembly. FIG. 5 is a rear elevation of a plate that constitutes the regulator assembly, and FIG. 6 is a cross section that is taken along line VI-VI in FIG. 5 so as to be viewed in the direction of the arrows.

The regulator assembly 40 includes: a base 41 into which the brush holder portion 10, the connector portion 14, a regulator circuit housing portion 15, and a hollow cylindrical slinger portion 21 are molded integrally using a polyphenylene sulfide (PPS) resin, for example; and a plate 42 that can be removably mounted onto the brush holder portion 10. Here, because a central axis of the slinger portion 21 is aligned with a central axis of the rotating shaft 4, a direction that is perpendicular to the central axis of the slinger portion 21 will be called a radial direction.

The brush holder portion 10 is disposed so as to extend radially from an outer circumferential surface of the slinger portion 21. Brush insertion apertures 10a are formed on the brush holder portion 10 so as to be separated in an axial direction of the slinger portion 21 and so as to face inside the slinger portion 21. The regulator circuit housing portion 15 is disposed so as to overlap with and be adjacent to the brush holder portion 10 at a first end of the brush holder portion 10 in the axial direction of the slinger portion 21. The connector portion 14 is disposed so as to be adjacent to the regulator circuit housing portion 15 radially outside the regulator circuit housing portion 15 such that an opening portion 14a faces radially outward. Respective center lines of the brush holder portion 10, the connector portion 14, and the regulator circuit housing portion 15 are positioned in a common plane that passes through the central axis of the slinger portion 21, i.e., the central axis of the rotating shaft 4. Ventilating apertures 41a are disposed through the base 41 radially inside the regulator circuit housing portion 15 on a first circumferential side of the brush holder portion 10.

The regulator circuit 13 is fixed to a circuit heatsink 22 using adhesive, etc., and is housed and held inside the regulator circuit housing portion 15 from an opening of the regulator circuit housing portion 15 at a first axial end of the slinger portion 21. A plurality of fins 22a that extend radially are disposed so as to stand on a rear side of the circuit heatsink 22. An insulating resin is injected so as to fill the regulator circuit housing portion 15 through a resin injection aperture 16a that is open on a radially outer side of the regulator circuit housing portion 15. The brushes 11 are inserted into the respective brush insertion apertures 10a of the brush holder portion 10, and are pressed toward the slinger portion 21 by forces from springs 25.

Caps that close the brush insertion apertures 10a are configured so as to have a two-layer construction that is constituted by a resin cap 23 and a rubber cap 24. The resin cap 23 is mounted by fitting two end recess portions 23a thereof from a radially upper end portion of the brush holder portion 10 into flange portions 10b that are disposed so as to protrude from two circumferential sides of the brush holder portion 10. The rubber cap 24 is fixed to an inner surface of the resin cap 23 and closes the respective brush insertion apertures 10a.

First and second regulator assembly mounting penetrating apertures 26 and 27 are disposed through portions of the base 41 on two sides of the brush holder portion 10, and an engaging protruding portion 26a is formed integrally on the base 41 in an annular shape around the first regulator assembly mounting penetrating aperture 26. In addition, first and second electrode terminal portions 28 and 29 are formed so as to be exposed from the base 41 radially outside the slinger portion 21.

The plate 42 is molded using a PPS resin, for example, and has: a straightening vane portion 43 that has a front surface that is a flat surface; and a cover portion 44 that is disposed so as to extend at a right angle from the straightening vane portion 43 and that approximately covers the resin injection aperture 16a of the regulator circuit housing portion 15.

First ends of insert conductors that are insert molded into the plate 42 are exposed from the straightening vane portion 43 so as to form third and fourth electrode terminal portions 46 and 47, and second ends project into a capacitor housing portion 49 that is recessed into a rear surface of the straightening vane portion 43. A noise-preventing capacitor 48 is connected to the end portions of the insert conductors that project into the capacitor housing portion 49, and is housed inside the capacitor housing portion 49. A filler resin 50 is injected into the capacitor housing portion 49 so as to embed the capacitor 48. In addition, third and fourth regulator assembly mounting penetrating apertures 30 and 31 are disposed through the straightening vane portion 43 at positions that correspond to the first and second regulator assembly mounting penetrating apertures 26 and 27 on the base 41.

An interfitting portion 51 that fits together with the brush holder portion 10 is formed so as to have a partially stepped internal shape that conforms to an external shape of the radially upper end portion of the brush holder portion 10 in a vicinity of a root base portion of the cover portion 44 of the straightening vane portion 43. The plate 42 is mounted to the base 41 by fitting the interfitting portion 51 over the brush holder portion 10. The cover portion 44 thereby presses an upper end surface of the resin cap 23 so as to prevent the resin cap 23 from dislodging. The brush holder portion 10 and the straightening vane portion 43 are positioned approximately in a common plane so as to constitute a generally flat surface.

Figure 7:
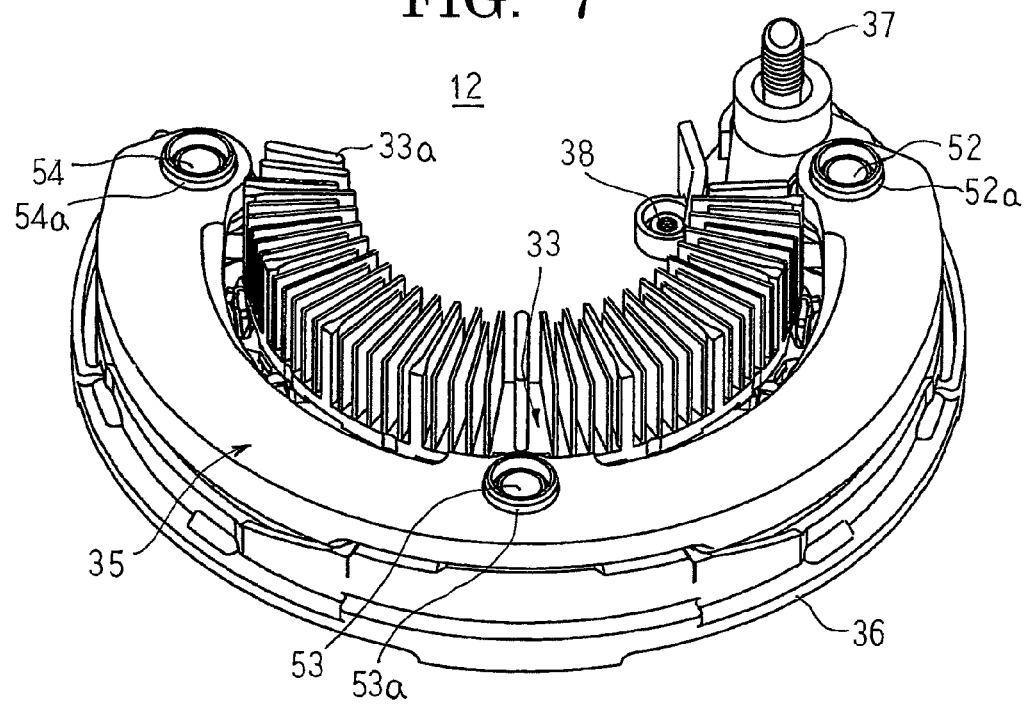
FIG. 7 is a perspective of a rectifier that can be used in the automotive alternator according to the preferred embodiment of the present invention.
Figure 8A:
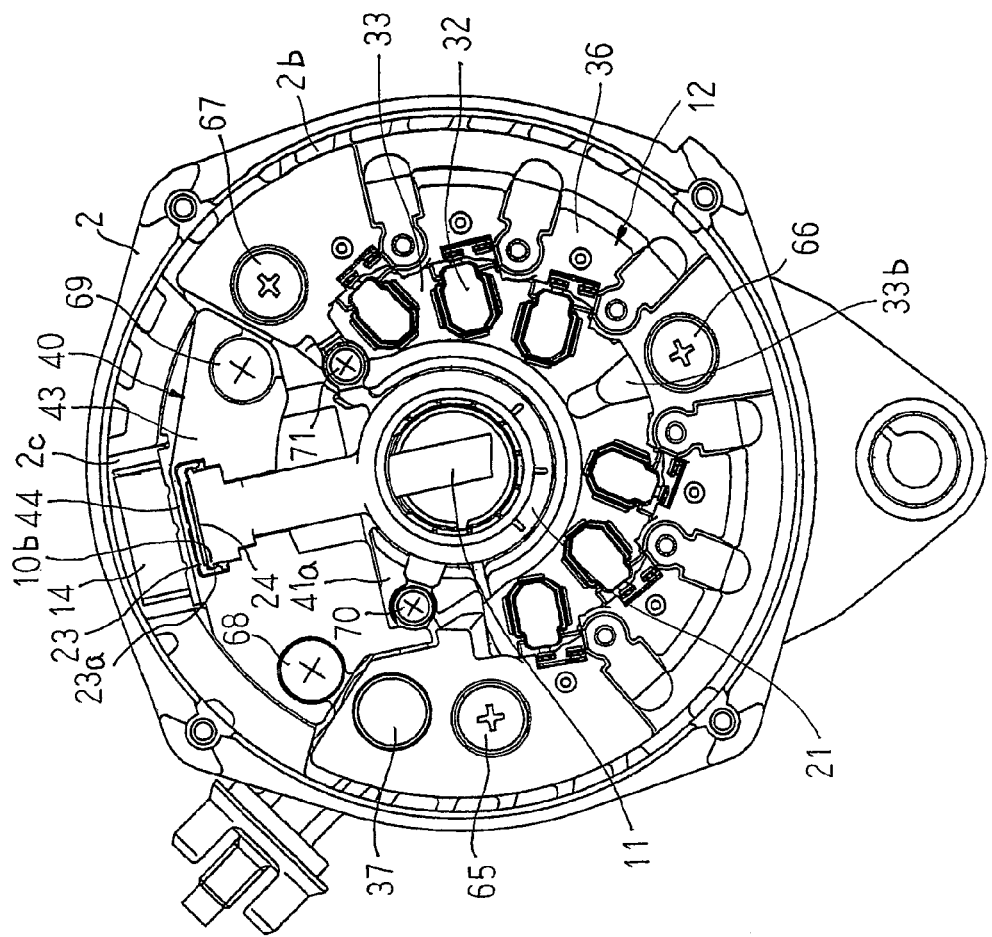
FIGS. 8A and 8B are views that show a mounted state of the rectifier and the regulator assembly that can be used in the automotive alternator according to the preferred embodiment of the present invention.
Figure 8B:
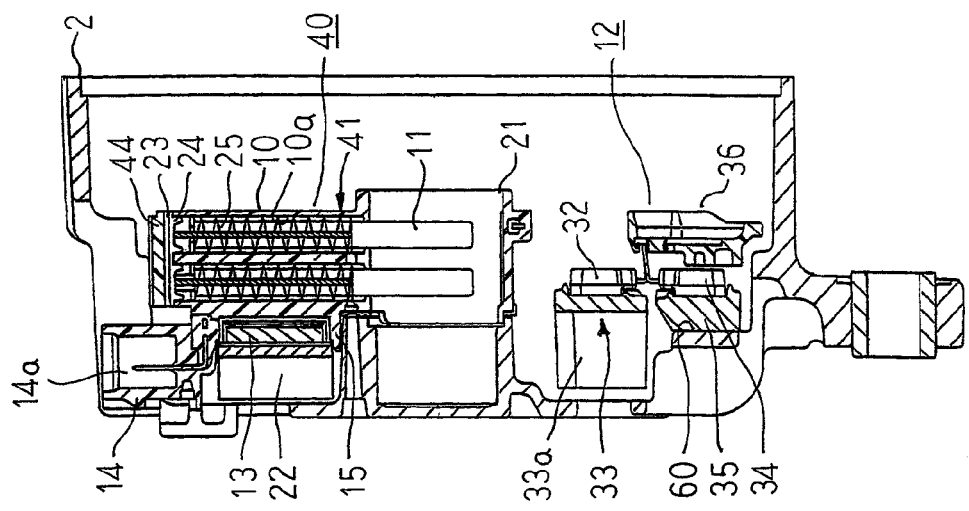
Figure 9:
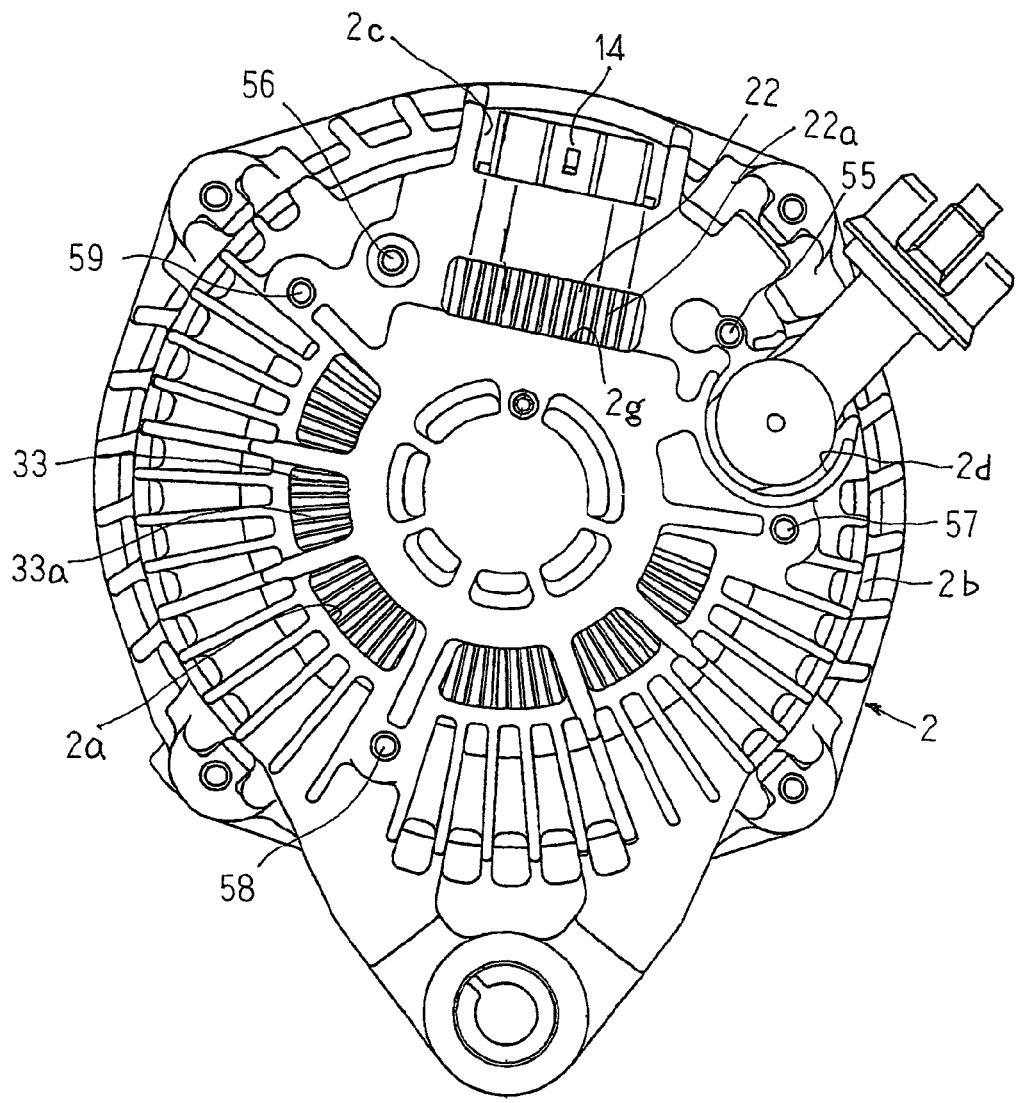
FIG. 9 is a rear-end end elevation of the automotive alternator according to the preferred embodiment of the present invention.
Figure 10:
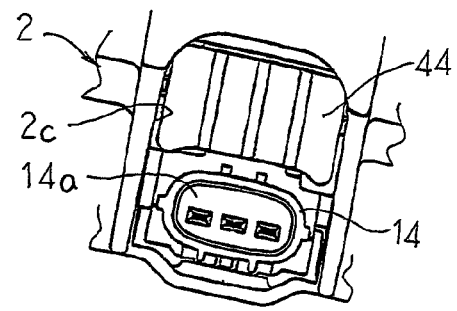
FIG. 10 is a top plan of a vicinity of a lead opening in the automotive alternator according to the preferred embodiment of the present invention.
Figure 13:
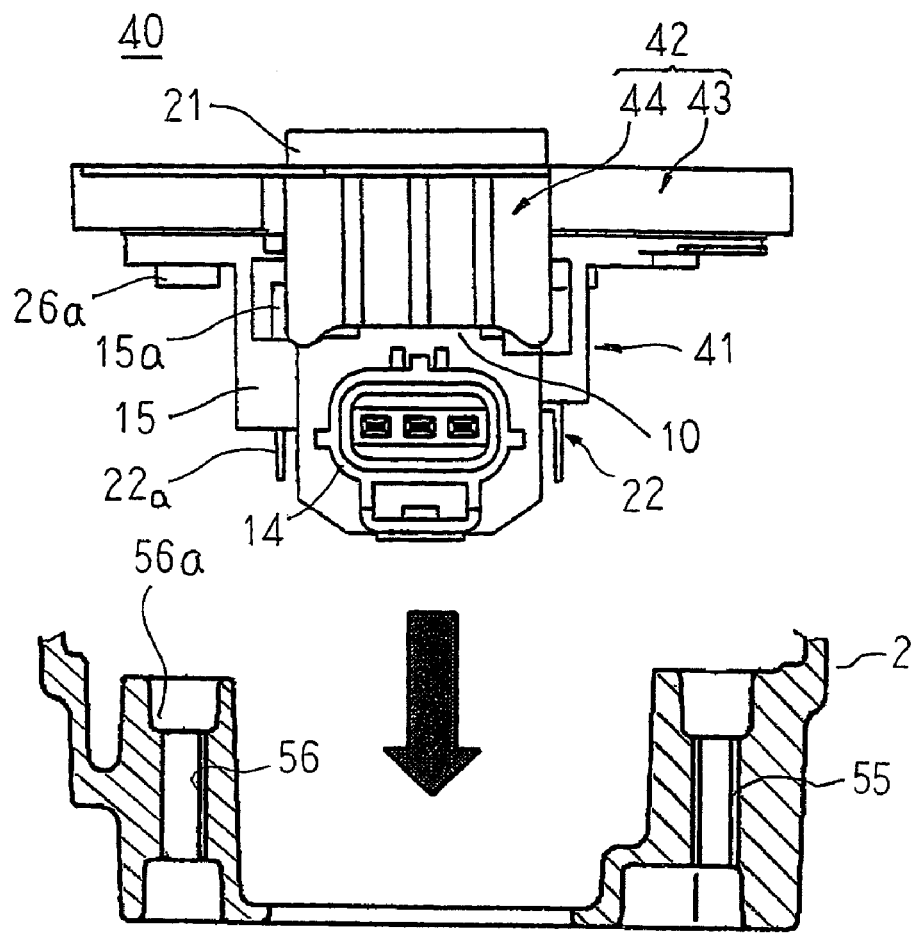
FIG. 13 is a diagram that explains a method for mounting the regulator assembly that can be used in the automotive alternator according to the preferred embodiment of the present invention.
Figure 14:
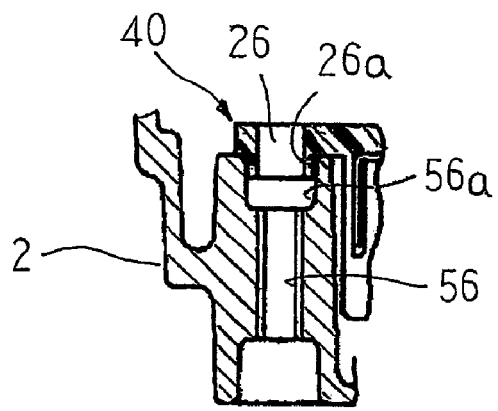
FIG. 14 is a partial cross section that shows a method for mounting the regulator assembly that can be used in the automotive alternator according to the preferred embodiment of the present invention.

Next, a mounted state of the rectifier 12 and the regulator assembly 40 will be explained. FIG. 7 is a perspective of a rectifier that can be used in the automotive alternator according to the preferred embodiment of the present invention. FIGS. 8A and 8B are views that show a mounted state of the rectifier and the regulator assembly that can be used in the automotive alternator according to the preferred embodiment of the present invention, FIG. 8A showing a front elevation thereof and FIG. 8B showing a cross section thereof. FIG. 9 is a rear-end end elevation of the automotive alternator according to the preferred embodiment of the present invention, FIG. 10 is a top plan of a vicinity of a lead opening in the automotive alternator according to the preferred embodiment of the present invention, FIG. 11 is a front elevation that shows a mounted state of the rectifier in the automotive alternator according to the preferred embodiment of the present invention, FIG. 12 is a diagram showing a rear bracket in the automotive alternator according to the preferred embodiment of the present invention when viewed from inside, FIG. 13 is a diagram that explains a method for mounting the regulator assembly that can be used in the automotive alternator according to the preferred embodiment of the present invention, and FIG. 14 is a partial cross section that shows a method for mounting the regulator assembly that can be used in the automotive alternator according to the preferred embodiment of the present invention.

Figure 11:
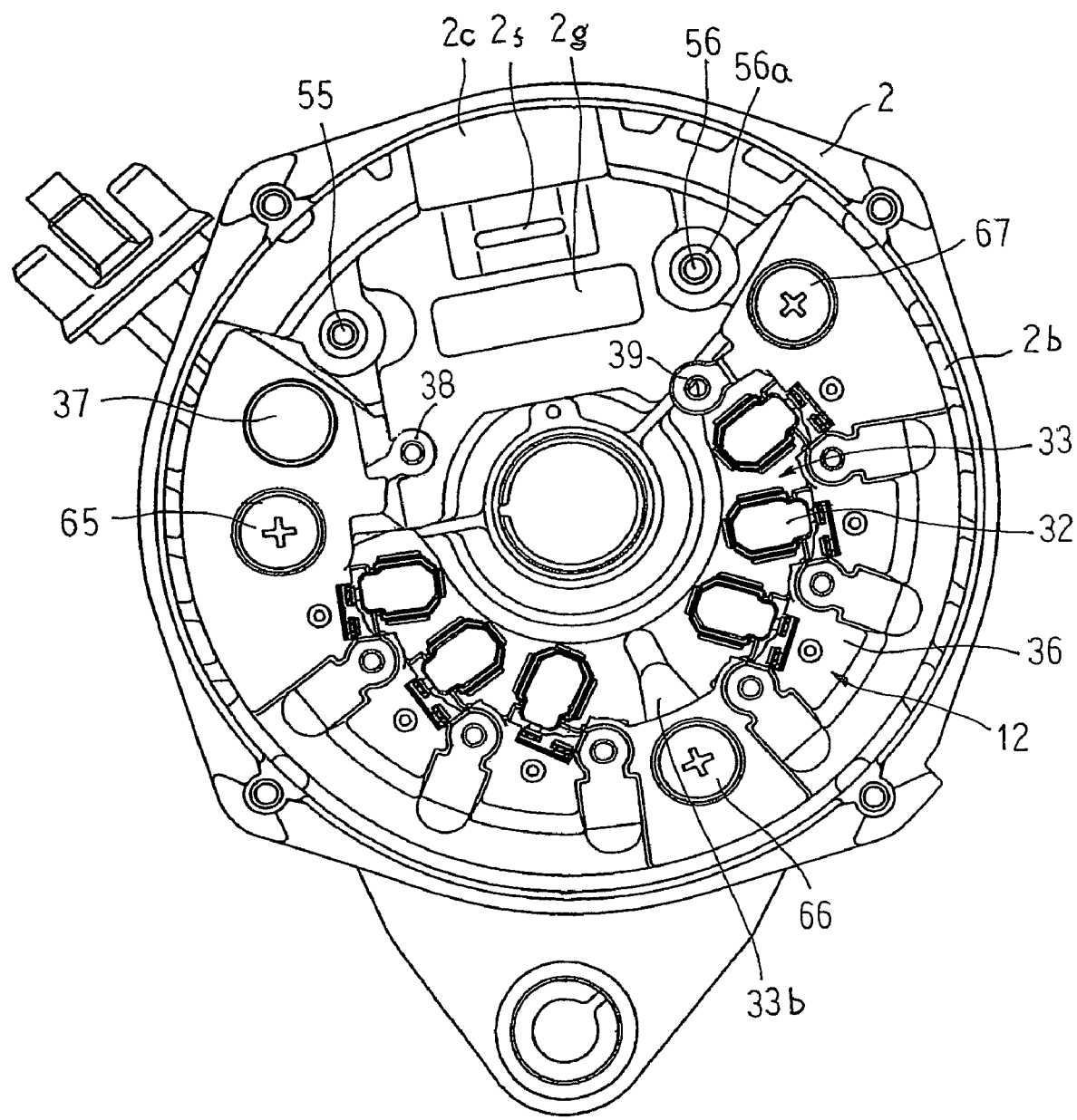
FIG. 11 is a front elevation that shows a mounted state of the rectifier in the automotive alternator according to the preferred embodiment of the present invention.

As shown in FIGS. 7, 8 and 11, the rectifier 12 includes: a positive-side heatsink 33 that is formed so as to have an approximate C shape, that has flange portions 33b that are disposed so as to extend radially outward from a central portion and two end portions of a front surface, and that has positive-side diodes 32 mounted to the front surface; a negative-side heatsink 35 that is formed so as to have an approximate C shape, and that has negative-side diodes 34 mounted to a front surface; a circuit board 36 that is formed so as to have an approximate C shape; and a B terminal bolt 37 that constitutes an output terminal of the rectifier 12, and that is held by press-fitting a knurl into the positive-side heatsink 33. The negative-side heatsink 35 is disposed concentrically in a common plane with the positive-side heatsink 33 radially outside the positive-side heatsink 33, and the circuit board 36 is disposed so as to be stacked on a front side of the negative-side heatsink 35. Here, the flange portions 33b are interposed between the negative-side heatsink 35 and the circuit board 36 in an insulated state.

The positive-side and negative-side diodes 32 and 34 are connected by insert conductors that have been insert-molded into the circuit board 36 so as to constitute a rectifier circuit. The insert conductors also extend outward from the circuit board 36 to constitute first and second electrode terminal portions 38 and 39. A plurality of fins 33a are disposed so as to stand in a radial pattern on a rear surface of the positive-side heatsink 33. Rectifier mounting penetrating apertures 52, 53, and 54 are disposed through at three positions on the negative-side heatsink 35 that include a central portion and two end portions, and resin engaging protruding portions 52a, 53a, and 54a are disposed so as to project from the rear surface of the negative-side heatsink 35 in annular shapes around the rectifier mounting penetrating apertures 52, 53, and 54. The rear surface of the negative-side heatsink 35 constitutes a mount surface for the rectifier 12. Moreover, although not shown, rectifier mounting penetrating apertures are disposed through the respective the flange portions 33b and the circuit board 36 so as to correspond to the rectifier mounting penetrating apertures 52, 53, and 54.

Figure 12:
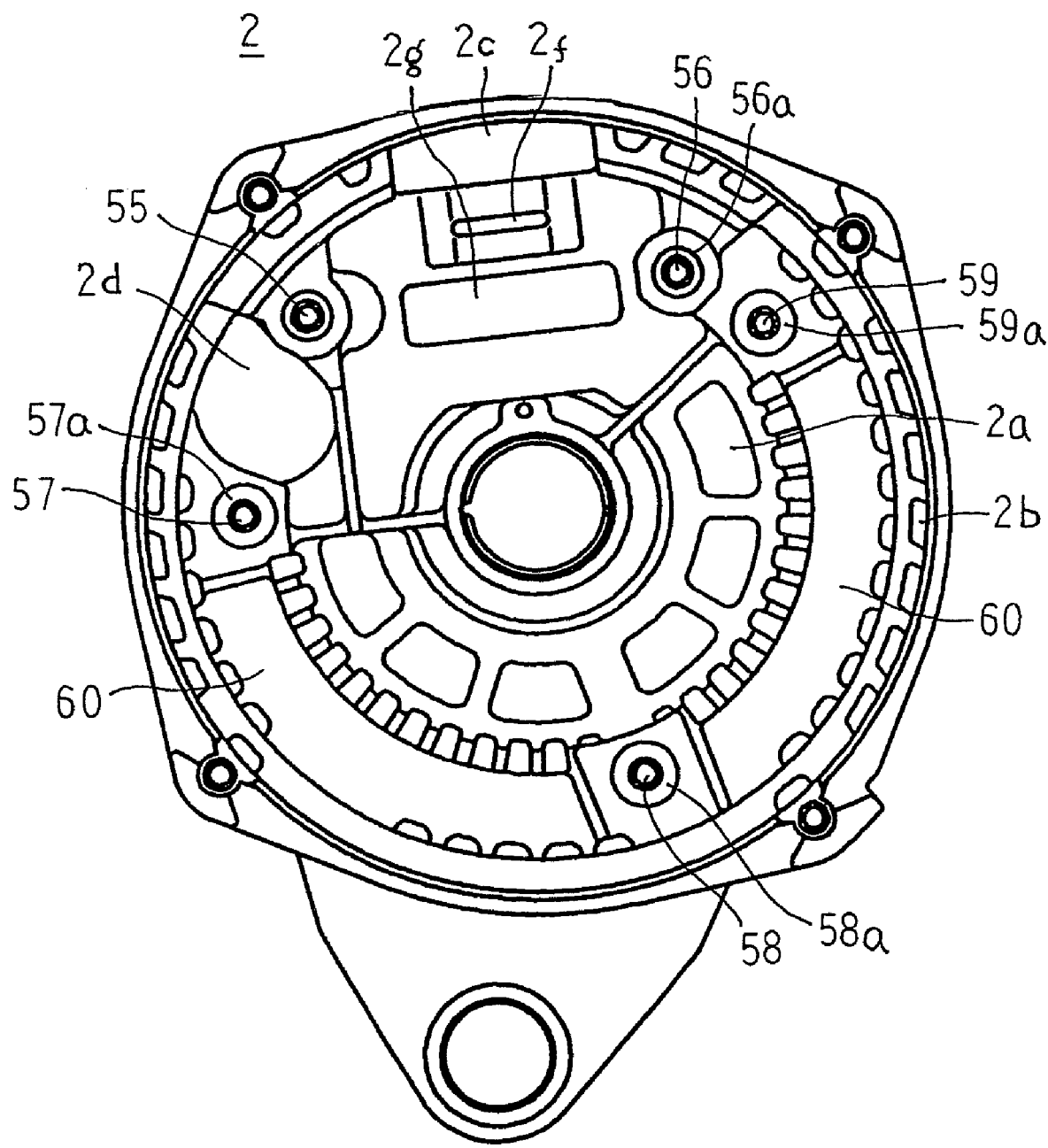
FIG. 12 is a diagram showing a rear bracket in the automotive alternator according to the preferred embodiment of the present invention when viewed from inside.

In the rear bracket, as shown in FIGS. 9 and 12, a large number of first suction apertures 2a are disposed on an end surface of the rear bracket 2 so as to face the fins 33a of the positive-side heatsink 33, and a large number of discharge apertures 2b are disposed on side surfaces of the rear bracket 2. A connector portion lead opening 2c for connecting an external connector to the connector portion 14 and a B terminal lead opening 2d are disposed through respective portions of the rear bracket 2. A positioning portion 2f for positioning the connector portion 14 is disposed on an inner wall surface of the rear bracket 2, and large suction apertures 2g are disposed through the rear bracket opposite the heatsink 22 of the regulator circuit 13.

First and second regulator assembly mounting threaded apertures 55 and 56 for mounting the regulator assembly 40 are cut into an inner wall surface of the rear bracket 2, and a receiving recess portion 56a is recessed in an annular shape around the first regulator assembly mounting threaded aperture 56. In addition, rectifier mounting threaded apertures 57, 58, and 59 for mounting the rectifier 12 are cut into an inner wall surface of the rear bracket 2 at an approximately uniform pitch circumferentially. Annular receiving recess portions 57a, 58a, and 59a are recessed into the inner wall surface of the rear bracket 2 so as to surround the rectifier mounting threaded apertures 57, 58, and 59. A mounting surface 60 for the rectifier 12 is also formed on the inner wall surface of the rear bracket 2 so as to have an arc-shaped flat surface that conforms to the rear surface of the negative-side heatsink 35.

The rectifier 12 is housed inside the rear bracket 2 in a positioned state by inserting the engaging protruding portions 52a, 53a, and 54a that are formed on the rear surface of the negative-side heatsink 35 into the receiving recess portions 57a, 58a, and 59a that are formed on the inner wall surface of the rear bracket 2. At that time, the rear surface of the negative-side heatsink 35 is mounted onto the mounting surface 60. In addition, the rectifier 12 is mounted to the rear bracket 2 as shown in FIG. 11 by passing rectifier mounting screws 65, 66, and 67 through the circuit board 36, the flange portions 33b of the positive-side heatsink 33, and the rectifier mounting penetrating apertures 52, 53, and 54 that have been disposed through the negative-side heatsink 35, and fastening them into the rectifier mounting threaded apertures 57, 58, and 59 that are formed on the inner wall surface of the rear bracket 2.

Next, as shown in FIG. 13, the regulator assembly 40 is inserted between the two end portions of the approximate C shape of the rectifier 12 from an axial direction. Thus, as shown in FIG. 14, the regulator assembly 40 is housed between the two end portions of the approximate C shape of the rectifier 12 in a positioned state by fitting the engaging protruding portion 26a that is formed on the base 41 into the receiving recess portion 56a that is formed on the inner wall surface of the rear bracket 2. The regulator assembly 40 is then mounted to the rear bracket 2 as shown in FIG. 8A by passing a second regulator assembly mounting screw 69 through the third and first regulator assembly mounting penetrating apertures 30 and 26 and fastening it into the second regulator assembly mounting threaded aperture 56, and by passing a first regulator assembly mounting screw 68 through the fourth and second regulator assembly mounting penetrating apertures 31 and 27 and fastening it into the first regulator assembly mounting threaded aperture 55. In addition, the second and third electrode terminal portions 29 and 46 of the regulator assembly 40 are fastened to the first electrode terminal portion 38 of the rectifier 12 by a screw 70, and the first electrode terminal portion 28 of the regulator assembly 40 is fastened to the second electrode terminal portion 39 of the rectifier 12 by a screw 71.

Here, the front surface of the straightening vane portion 43 is positioned in a common plane with a surface of the rectifier 12 that faces the blades of the rear cooling fan 7b so as to constitute a flat annular blade-facing surface. As shown in FIG. 10, a large portion of the connector portion lead opening 2c is closed over by the cover portion 44 of the plate 42 except for the lead portion of the connector portion 14.

In an automotive alternator that is configured in this manner, air is sucked into the rear bracket 2 through the suction apertures 2a and 2g due to rotation of the rear cooling fan 7b, which operates together with the rotation of the rotor 6.

The air that has been sucked in through the first suction apertures 2a flows radially inward along the radial fins 33a of the positive-side heatsink 33, and flows toward the rotor 6 along a central axis from an inner circumferential edge of the positive-side heatsink 33. The air that has flowed toward the rotor 6 is deflected centrifugally by the rear cooling fan 7b, cools the coil ends 20, and is discharged externally through the discharge apertures 2b.

The air that has been sucked in through the large suction apertures 2g flows radially inward along the fins 22a of the circuit heatsink 22, which extend radially, passes through the ventilating apertures 41a from an inner circumferential edge of the circuit heatsink 22, and flows along the central axis toward the rotor 6. The air that has flowed toward the rotor 6 is deflected centrifugally by the rear cooling fan 7b, cools the coil ends 20, and is discharged externally through the discharge apertures 2b.

Temperature increases in the positive-side diodes 32 of the rectifier 12 and power transistors of the regulator circuit 13, which constitute heat sources, are suppressed by heat exchange between the air that flows along the fins 22a and 33a of the circuit and positive-side heatsinks 22 and 33 and the circuit and positive-side heatsinks 22 and 33. Heat that is generated by the negative-side diodes 34 of the rectifier 12 is also transferred directly to the rear bracket 2 from the negative-side heatsink 35 and is radiated from a front surface of the rear bracket 2, suppressing temperature increases in the negative-side diodes 34.

According to the present invention, because the engaging protruding portion 26a is formed on the base 41 of the regulator assembly 40 and the receiving recess portion 56a is formed on the inner wall surface of the rear bracket 2, the regulator assembly 40 can be disposed on the rear bracket 2 in a positioned state easily by fitting the engaging protruding portion 26a together with the receiving recess portion 56a. Thus, positioning between the regulator assembly mounting penetrating apertures 26, 27, 30, and 31 and the regulator assembly mounting threaded apertures 55 and 56 is facilitated, improving assembly. Positioning between the electrode terminal portions 28 and 29 of the regulator assembly 40 and the electrode terminal portions 38 and 39 of the rectifier 12 is also similarly facilitated, improving assembly.

Because the engaging protruding portion 26a and the receiving recess portion 56a are formed around the first regulator assembly mounting penetrating aperture 26 and the first regulator assembly mounting threaded aperture 56 that are to be positioned, the first regulator assembly mounting penetrating aperture 26 and the first regulator assembly mounting threaded aperture 56 can be positioned simply and reliably, further improving assembly. In addition, positioning accuracy of the connector portion 14 relative to the rear bracket 2 is increased. Because the engaging protruding portion 26a and the receiving recess portion 56a are formed around the first regulator assembly mounting penetrating aperture 26 and the first regulator assembly mounting threaded aperture 56, the engaging protruding portion 26a and the receiving recess portion 56a can also be formed easily.

Because the engaging protruding portion 26a is formed only around the first regulator assembly mounting penetrating aperture 26, the regulator assembly 40 is pivotable relative to the rear bracket 2 around the receiving recess portion 56a, further facilitating positioning between the electrode terminal portions 28 and 29 of the regulator assembly 40 and the electrode terminal portions 38 and 39 of the rectifier 12.

According to the present invention, because the engaging protruding portions 52a, 53a, and 54a are formed on the rectifier 12 and the receiving recess portions 57a, 58a, and 59a are formed on the inner wall surface of the rear bracket 2, the rectifier 12 can be disposed on the rear bracket 2 in a positioned state easily by fitting the engaging protruding portions 52a, 53a, and 54a together with the receiving recess portions 57a, 58a, and 59a. Thus, positioning between the rectifier mounting penetrating apertures 52, 53, and 54 and the rectifier mounting threaded apertures 57, 58, and 59 is facilitated, improving assembly. Positioning between the electrode terminal portions 28 and 29 of the regulator assembly 40 and the electrode terminal portions 38 and 39 of the rectifier 12 is also similarly facilitated, improving assembly.

Because the engaging protruding portions 52a, 53a, and 54a and the receiving recess portions 57a, 58a, and 59a are formed around the rectifier mounting penetrating apertures 52, 53, and 54 and the rectifier mounting threaded apertures 57, 58, and 59 that are to be positioned, the rectifier mounting penetrating apertures 52, 53, and 54 and the rectifier mounting threaded apertures 57, 58, and 59 can be positioned simply and reliably, further improving assembly. Because the engaging protruding portions 52a, 53a, and 54a and the receiving recess portions 57a, 58a, and 59a are formed around the rectifier mounting penetrating apertures 52, 53, and 54 and the rectifier mounting threaded apertures 57, 58, and 59, the engaging protruding portions 52a, 53a, and 54a and the receiving recess portions 57a, 58a, and 59a can also be formed easily.

Because the brush holder portion 10, the regulator circuit housing portion 15, and the connector portion 14 are formed such that their respective center lines are positioned in a common plane that includes the central axis of the rotating shaft 4, exclusive circumferential space for the regulator assembly 40 can be reduced. Thus, exclusive circumferential space for the rectifier 12 that is disposed in a common plane with the central axis of the regulator assembly 40 that is perpendicular to the rotating shaft 4 can be increased, enabling the heat radiating area of the positive-side and negative-side heatsinks 33 and 35 to be enlarged, thereby enabling heat that is generated by the positive-side and negative-side diodes 32 and 34 to be radiated effectively. Because the heat radiating area of the circuit heatsink 22 is not reduced at all, cooling of the power transistors of the regulator circuit 13 does not deteriorate.

Because the straightening vane portion 43 functions together with the rectifier 12 and the brush holder portion 10 to constitute a flat annular blade-facing surface that faces the blades of the rear cooling fan 7b, the occurrence of magnetic noise that results from rotation of the rear cooling fan 7b is suppressed.

Because the connector portion lead opening 2c that leads the connector portion 14 out is mostly closed over by the connector portion 14 and the cover portion 44, penetration of water, dust, etc., into the rear bracket 2 from outside is suppressed. In addition, because the resin injection aperture 16a is not exposed externally through the connector portion lead opening 2c by the cover portion 44, the penetration of water, dust, etc., into the regulator circuit housing portion 15 through the resin injection aperture 16a is also suppressed.

Because the connector portion 14 projects radially outward, the regulator assembly 40 can be mounted into the rear bracket 2 easily.

Because the ventilating apertures 41a are formed on the regulator assembly 40 radially outside the slinger portion 21, the cooling airflows that have flowed radially inward along the fins 22a of the circuit heatsink 22 flow through the ventilating apertures 41a toward the rotor 6, reducing pressure loss.

Moreover, in the above embodiment, the engaging protruding portion 26a of the regulator assembly 40 is formed only around the first regulator assembly mounting penetrating aperture 26 on one side of the brush holder portion 10, but engaging protruding portions may also be formed around each of the regulator assembly mounting penetrating apertures on two sides of the brush holder portion. In that case, some margin of error for threaded aperture alignment, etc., may be eliminated, but there will be no deleterious effects provided that each of the parts is machined accurately.

In the above embodiment, the connector portion 14 projects radially through the rear bracket 2 such that the opening portion 14a faces radially outward, but a connector portion may also be prepared so as to project axially through the rear bracket such that the opening portion faces axially. In that case, radial dimensions of the regulator assembly can be reduced.

What is claimed is:

1. An automotive alternator comprising:
a rotor that is fixed to a rotating shaft;
a front bracket and a rear bracket that rotatably support said rotating shaft and that envelop said rotor;
a stator that is held by said front bracket and said rear bracket and that surrounds said rotor;
a rectifier comprising:
an approximately C-shaped rectifier heatsink to which a plurality of diodes are mounted; and
an approximately C-shaped resin circuit board in which said plurality of diodes are connected by insert conductors so as to constitute a rectifier circuit,
said rectifier being mounted to said rear bracket so as to be disposed around said rotating shaft in an approximate C shape and rectifying alternating-current output that is generated by said stator into direct current;
a regulator circuit that adjusts magnitude of alternating-current voltage that is generated by said stator; and
a regulator assembly comprising:
a brush holder portion that is disposed so as to face said rotor such that an aperture direction of a brush insertion aperture is aligned in a radial direction and that holds a brush inside said brush insertion aperture; and
a base into which a regulator circuit housing portion that is disposed such that a resin injection aperture faces radially outward and that houses and holds said regulator circuit is molded integrally into said brush holder portion near said rear bracket,
said regulator assembly being mounted to said rear bracket such that said base is disposed between two end portions of said approximate C shape of said rectifier,
wherein:
a regulator assembly mounting threaded aperture is formed on an inner wall surface of said rear bracket;
a receiving recess portion is recessed into an inner wall surface of said rear bracket around said regulator assembly mounting threaded aperture;
a regulator assembly mounting penetrating aperture is disposed through said base;
an engaging protruding portion is disposed so as to project from said base around said regulator assembly mounting penetrating aperture; and
said regulator assembly is fixed to said rear bracket by engaging said engaging protruding portion in said receiving recess portion and fastening a regulator assembly mounting screw that has been passed through said regulator assembly mounting penetrating aperture into said regulator assembly mounting threaded aperture.

2. An automotive alternator according to claim 1, wherein only one engaging protruding portion is formed on said base.

3. An automotive alternator according to claim 1, wherein:
a rectifier mounting threaded aperture is formed on an inner wall surface of said rear bracket;
a receiving recess portion is recessed into an inner wall surface of said rear bracket around said rectifier mounting threaded aperture;
a rectifier mounting penetrating aperture is disposed through said rectifier heatsink and said circuit board;
a engaging protruding portion is disposed so as to project from said rectifier heatsink around said rectifier mounting penetrating aperture; and
said rectifier is fixed to said rear bracket by engaging said engaging protruding portion in said receiving recess portion and fastening a rectifier mounting screw that has been passed through said rectifier mounting penetrating aperture into said rectifier mounting threaded aperture.

4. An automotive alternator according to claim 1, further comprising a connector portion is molded integrally into said base so as to be adjacent to a radially outer side of said regulator circuit housing portion, wherein said brush holder portion, said regulator circuit housing portion, and said connector portion are positioned such that respective center lines thereof are in a common plane that includes a central axis of said rotating shaft.

5. An automotive alternator according to claim 4, wherein said connector portion projects radially outward.

* * * * *